March 15, 1932. R. B. PEALER 1,849,381

PIPE CUTTER

Filed Sept. 30, 1930 3 Sheets-Sheet 1

Inventor
Robert B. Pealer,
By Bates, Golrick & Fears
Attorneys

March 15, 1932. R. B. PEALER 1,849,381
PIPE CUTTER
Filed Sept. 30, 1930 3 Sheets-Sheet 2

Inventor
Robert B. Pealer,
By Bates, Goldrick & Fears
Attorneys

March 15, 1932. R. B. PEALER 1,849,381
PIPE CUTTER
Filed Sept. 30, 1930 3 Sheets-Sheet 3

Inventor
Robert B. Pealer,
By Bates, Golrick & Faust,
Attorneys

Patented Mar. 15, 1932

1,849,381

UNITED STATES PATENT OFFICE

ROBERT B. PEALER, OF WARREN, OHIO, ASSIGNOR TO THE BORDEN COMPANY, OF WARREN, OHIO, A CORPORATION OF OHIO

PIPE CUTTER

Application filed September 30, 1930. Serial No. 485,476.

This invention relates to portable pipe cutters adapted for cutting comparatively large sizes of pipe. One of the objects of the invention is to provide such a cutter with suitable reduction gearing so that the requisite power for operation may be obtained to cut the large size of pipe.

Another object is to so devise the reduction gearing for driving the cutter tool that the power may be applied from a direction parallel with the axis of the pipe being cut. This enables employment of a driving motor, the shaft of which is connected by universal joints with the operating shaft of the pipe cutter, without materially increasing the space required for the operation.

Still another object of the invention is to so arrange the gearing that it will be entirely housed within the frame of the tool which is clamped to the pipe, whereby the gearing is protected from injury.

The above, and other features contributing to the efficiency of my pipe cutter, will be apparent from the detailed description thereof hereinafter given in connection with the drawings.

Figure 1:
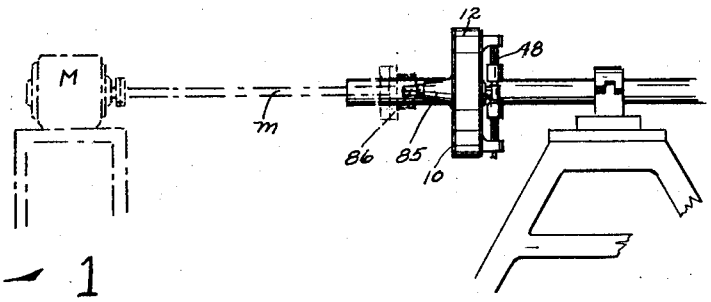
Figure 2:
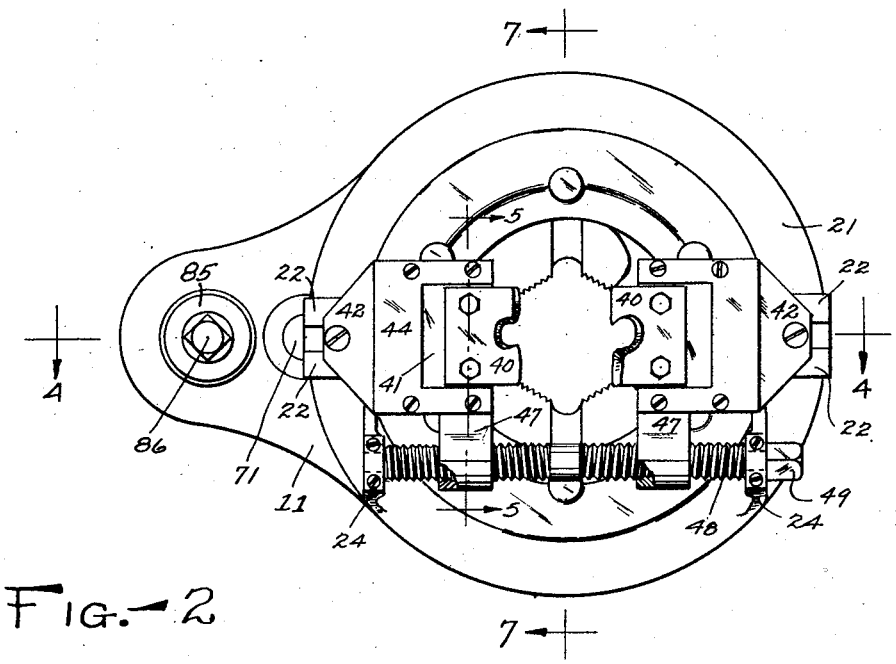
Figure 3:
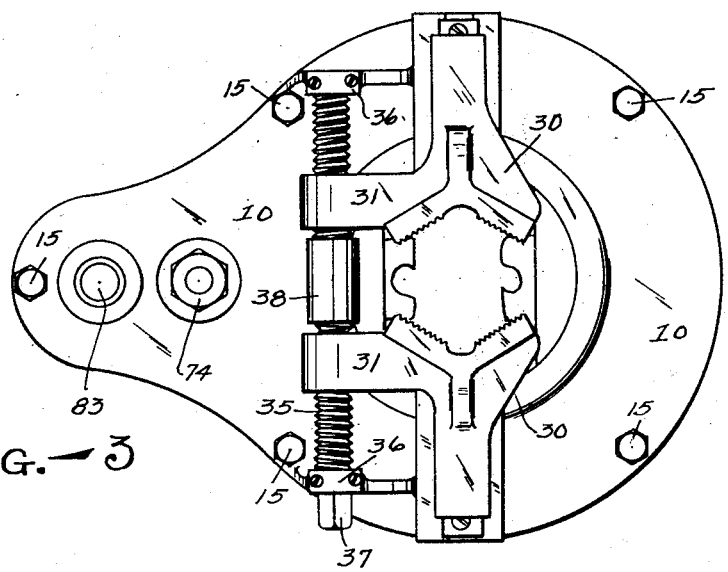
Figure 4:
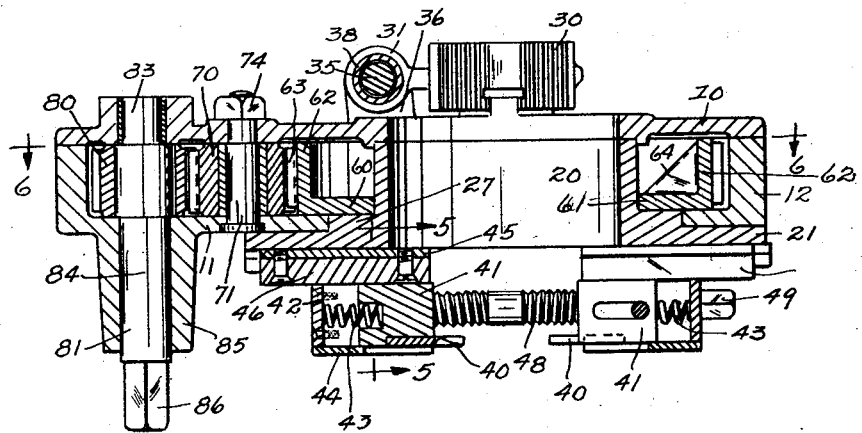
Figure 5:
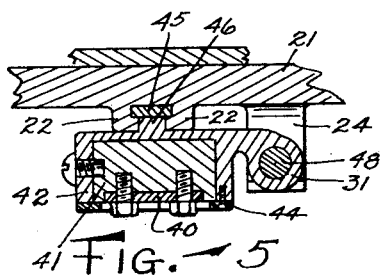
Figure 6:
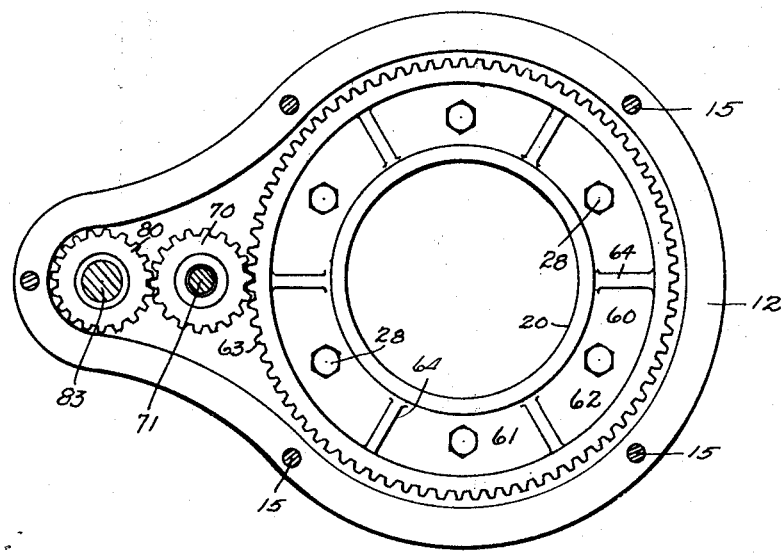
Figure 7:
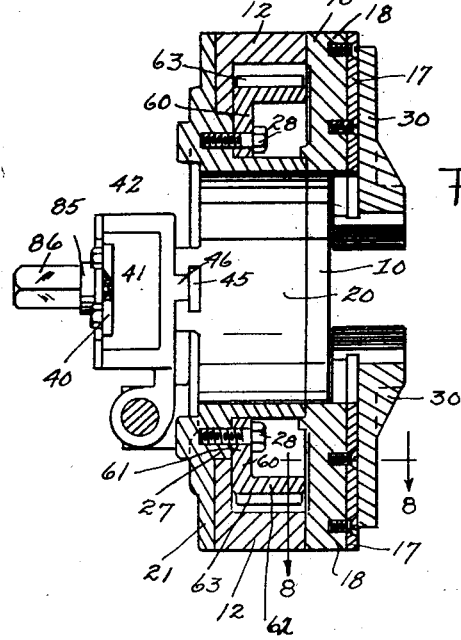
Figure 8:
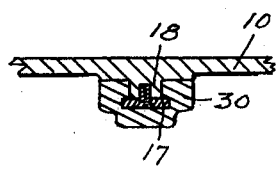

In the drawings Fig. 1 is a side elevation of my pipe cutter clamped on a pipe and coupled with a suitable driving motor illustrated in broken lines; Fig. 2 is a face view of the cutter; Fig. 3 is a rear view of the same; Fig. 4 is a section through the axis of the cutter and the axis of the driving shaft; Fig. 5 is a detail of one of the mountings for the cutter knives in a plane indicated by the line 5—5 in Fig. 4; Fig. 6 is a section through the cutter in a plane parallel with Fig. 2, as indicated by the line 6—6 on Fig. 4; Fig. 7 is an axial section at right angles to Fig. 5, the plane being indicated by the line 7—7 on Fig. 2; Fig. 8 is a detail of the pipe clamp, being a section on the line 8—8 on Fig. 7.

The frame of my cutter comprises a plate 10 and a hollow member having a plate-like portion 11 parallel with the plate 10 and a peripheral flange 12 abutting the plate 10. These two parts are held together by cap screws 15 passing through the plate 10 and threaded in the peripheral flange. The back plate 10 of the hollow frame carries means hereinafter described for clamping it to the pipe. Mounted on the front plate 11 and journalled within the hollow frame is a driven sleeve 20 carrying the cutter hereinafter described, and housed within the hollow frame is reduction gearing for rotating this sleeve.

The pipe clamp may be made of any suitable form. I have shown it as constructed substantially in accordance with prior Patent No. 1,150,220 granted August 17th, 1915, to my assignee The Borden Company. As indicated in that patent, and as here shown in Figs. 3, 4, 7 and 8, the pipe clamp comprises a pair of jaws 30 slidably mounted on overhanging guided strips 17 secured to ribs 18 on the rear of the frame plate 10. These jaws 30 have laterally projecting arms 31 internally threaded with right and left hand threads respectively, and occupying such threaded openings is a right and left hand screw 35 rotatively mounted in ears 36 carried by the back plate 10. The rotation of the screw, by means of a wrench applied to its angular end 37, causes the jaws to approach or recede, as desired. A loose sleeve 38 on the screw may limit the inward approach of the jaws. The clamp provides means for quickly and effectively locking the tool on the pipe to be cut.

The cutting knives, and the means for carrying and adjusting them, may also be made in accordance with the prior patent referred to. As indicated in that patent and shown in my Figures 2, 4 and 5, these knives 40 are mounted on blocks 41 which are slidable in a pair of housings 42 and are pressed toward each other by helical compression springs 43 within the housings, the springs being shown as bearing against the outer ends of the housings and occupying recesses in the blocks 41. The blocks are slidably retained within the housings by overhanging cover plates 44 rigidly secured to the bodies of the housings.

I have shown two housings 42, located diametrically opposite each other, and slidably guided on a lateral annular flange 21 of the driven sleeve 20. As shown this flange has parallel overhanging ribs 22 which receives underhanging gibs 45 on ribs 46 of the housings. Each housing is provided with an internally threaded arm 47 which receives a right and left hand screw 48 journalled in ears 24 on the flange 21. A suitable wrench applied to the angular end 49 of the screw feeds the knives toward or from the pipe.

In use, the knives are fed tightly against the pipe and the screw 48 is then turned further to cause the housings to advance on the stopped knives, compressing the springs; then, in operation, these springs, reacting, feed the knives inwardly during the rotation to maintain them in continuous engagement with the pipe without further attention to the screw 48.

In the prior patent referred to, the cutter housings are slidably mounted on a ring which carries external ratchet teeth and is fed by a pawl connected with a manual operating lever. In the present invention however, the annular member on which the cutter housings are guided, is the flanged head of the driven sleeve 20, hereinbefore mentioned, and this sleeve is driven by the powerful gearing housed within the hollow frame as hereinafter described.

The inner end of the sleeve 20 is journalled, as shown in Fig. 4, in a recess on the inner side of the back plate 10. Adjacent the flange 21 the sleeve is formed with an annular boss 27 which journals the sleeve in a larger opening in the front plate 11 of the housing. The sleeve is retained within the housing by means of a peculiarly formed spur gear 60 within the housing, surrounding the barrel portion of the sleeve 20 and having an annular portion 61 resting against the flat face of the boss 27, the bearing being secured to that boss by the cap screws 28. It will be seen therefore that the sleeve 20 and attached parts is effectively journalled in the housing frame.

The gear 60 is L-shaped in cross section, having the flat annular portion 61 heretofore referred to, having also a cylindrical portion 62 on the exterior of which are the spur teeth 63. Suitable diagonal webs 64 connecting the flat portion 61 and the cylindrical wall 62, brace the gear, and at the same time enable it to be comparatively light.

Meshing with the spur teeth 63 of the driven gear 60 is an idler pinion 70. This is mounted on a stud 71 mounted at one end in the plate 11 of the housing and at its other end passing through the back plate 10 and beyond it receiving a nut 74.

Meshing with the idler pinion is a driving pinion 80 which is mounted on, or formed as a part of, a driving shaft 81. The pinion is shown as keyed on this shaft, but, if desired, it may be formed integral therewith. The shaft 81 is journalled at the end 83 in the back plate 10 and on the other side of the pinion is a longer portion 84 journalled in a tubular boss 85 carried by the plate 11. An angular end 86 on the shaft furnishes means for rotating it.

If desired a crank could be applied to the end 86 to rotate the shaft 81 and thus through the reduction gearing drive the sleeve 20 carrying the cutter knives. As considerable power is required however for cutting the large sizes of pipe, it is frequently desirable to couple a motor with the driving shaft 81. Such motor is indicated at M in Fig. 1. Its armature shaft is connected by a universal joint with a shaft M having a universally connected socket with an angular interior embracing the head 86 of the driving shaft.

It will be noticed particularly, that the driving shaft 81 extends parallel with the axis of the pipe being cut. Accordingly, the motor M may be located in front of the cutter and just at one side of the projection of the pipe. In almost any installation there is space available in the longitudinal direction of the pipe, and by arranging the device to be connected with a motor in that region I adapt the tool to existing requirements much better than if the construction were such that the driving motor were at the side of the tool. My invention provides a more efficient tool than the hand operated ratchet device of the prior patent and one adapted for either hand or power operation. The gearing being entirely enclosed, the gear teeth may be kept properly greased, and there is no danger of dirt or chips injuring them.

I claim:

1. In a pipe cutter, the combination of a hollow frame having parallel front and back plates, a sleeve journalled in the front and back plates and having a head overhanging the front plate on the outside, a cutting knife carried by said head, a gear surrounding the sleeve within the frame, said gear having an annular portion secured to the sleeve head and overhanging the inner face of the front plate of the frame, wherein the front frame plate is rotatably gripped between the gear and the sleeve, and a driving shaft journalled in the frame on an axis parallel with the pipe axis and drivingly connected with said gear.

2. In a pipe cutter, the combination of a hollow frame having parallel front and back plates and a peripheral wall, a driven sleeve mounted in the frame having a cylindrical portion occupying the hollow of the frame and an annular flange extending onto the outside of the front plate of the frame and an annular boss adjacent the flange journalled in the front plate and having the cylindrical portions journalled in the back plate, a spur gear within the frame embracing the cylindrical sleeve and having an annular portion bearing against and secured to said boss, said gear overhanging the boss to maintain the driven sleeve journalled in the front and back plates of the frame, a driving shaft, and gearing within the frame connecting it with the gear mentioned.

3. In a pipe cutter, the combination of a hollow frame having parallel front and back plates, a sleeve journalled in the front and back plates and having a head overhanging the front plate on the outside, said sleeve and frame thereby forming an enclosed lubricant receptacle, opposed cutting knives carried by said head, means carried by the head for adjusting the knives, a gear surrounding the sleeve within the frame, said gear having an annular portion bolted to the sleeve head and overhanging the inner face of the front plate of the frame to prevent axial movement between the sleeve and the frame, said gear having a cylindrical portion connected with the annular portion and having gear teeth on its exterior, an idler pinion journalled in the frame and meshing with the gear first mentioned, a driving shaft journalled in the frame on an axis parallel with the pipe axis and having external teeth meshing with the idler pinion.

4. In a pipe cutter, the combination of a hollow frame comprising a back plate, parallel front plate and an outer peripheral wall between them, said parts being rigidly connected in practice, a pipe clamp carried on the outer side of the back plate, a sleeve journalled in both frame plates and forming an inner peripheral wall therebetween and having a lateral head overhanging the outside of the front plate, said frame and sleeve forming a lubricant receptacle, housings for cutting tools slidably mounted on the head, means carried by the head for feeding said housings toward each other, a spur gear within the hollow frame secured to the driven sleeve and furnishing means for maintaining it journalled in the front plate, a stud carried by the frame parallel with the pipe axis, an idler pinion on said stud within the frame meshing with the gear, a boss on the front plate having a bore parallel with the pipe axis, and a driving shaft mounted in said bore and having a pinion within the hollow frame meshing with the idler pinion.

In testimony whereof, I hereunto affix my signature.

ROBERT B. PEALER.